United States Patent [19]
Caldwell

[11] Patent Number: 5,505,840
[45] Date of Patent: Apr. 9, 1996

[54] CHLORINATOR-FILTER SYSTEM FOR SEWAGE TREATMENT PLANTS

[76] Inventor: Dean Caldwell, 18 Lake View, DeRidder, La. 70634

[21] Appl. No.: 298,114

[22] Filed: Aug. 31, 1994

[51] Int. Cl.$^6$ ................................. C02F 9/00; C02F 1/76
[52] U.S. Cl. ........................ 210/87; 210/170; 210/199; 210/202; 210/206; 210/254; 210/258; 210/266; 210/275
[58] Field of Search .......................... 210/87, 170, 199, 210/201, 202, 206, 254, 258, 266, 275, 754

[56] References Cited

U.S. PATENT DOCUMENTS

| | | | |
|---|---|---|---|
| 3,738,782 | 6/1973 | Fraser | 417/423.14 |
| 4,197,200 | 4/1980 | Alig | 210/254 |
| 4,208,283 | 6/1980 | Brouzes | 210/754 |
| 4,314,906 | 2/1982 | Dunn et al. | 210/754 |
| 4,333,833 | 6/1982 | Longley et al. | 210/754 |
| 4,626,359 | 12/1986 | Bennett et al. | 210/275 |
| 4,804,478 | 2/1989 | Tamir | 210/199 |
| 5,112,483 | 5/1992 | Cluff | 210/266 |
| 5,314,628 | 5/1994 | Sloan | 210/754 |
| 5,399,260 | 3/1996 | Eldredge et al. | 210/87 |

Primary Examiner—Peter A. Hruskoci
Assistant Examiner—Theodore M. Green
Attorney, Agent, or Firm—Rodney Bryant Jordan

[57] ABSTRACT

An apparatus and method of using the apparatus in the final stages of purification of sewage water in which the effluent is placed under pressure by a pump and forced through a filter. Part of the effluent is sampled and chlorinated by a chlorine gas injector and then reintroduced into the lager body of effluent. The entire mixture is held within a detention chamber in order to allow the chlorine to dissipate, and then pumped out into a natural stream through a pipe in which air bubbles are injected in order to replenish the oxygen level.

3 Claims, 2 Drawing Sheets

CHLORINATOR-FILTER SYSTEM FOR SEWAGE TREATMENT PLANTS

BACKGROUND OF THE INVENTION

The invention as described herein is a system and apparatus for treating sewage at its final stage of treatment. Unlike conventional systems, the system described is a pressurized system in which chlorine can be introduced into the system in a gaseous form and in which the discharge of the system is filtered. This improves both bacteriological and solid discharge levels.

DESCRIPTION OF THE PRIOR ART

The process of treating and disposing of sewage through the use of a series of holding ponds has been in use for many years, however, there has been a persistent problem with the discharge of these systems into natural waterways. The bacteria which allow the ponds to eliminate the waste should be removed as well as any sediment which has escaped the system. The most common method of removing bacteria is the introduction of chlorine into the effluent. The chlorine must then be substantially removed. Ordinary systems, which operate on gravity flow, are limited in their capacity to remove solids. In addition, chlorine tablets must be used rather than less expensive and more effective chlorine gas. These systems are also difficult to monitor and control due to the inability to utilize the standard fluid meter or water meter in measuring the volume of discharged effluent.

SUMMARY OF THE INVENTION

The invention comprises a filter system designed to be used in conjunction with a series of holding ponds as a final filter for the effluent prior to its introduction into a natural waterway. The effluent is pumped from the final pond by a centrifugal pump. The larger solid particles contained in the effluent are trapped by and manually removed from a screen filter which is placed in the system just ahead of the pump. The larger portion of the effluent is pumped to a sand and gravel filter which filters out smaller solid particles. A smaller portion of the effluent bypasses the filter and is pumped to a gas chlorine injector. After chlorination the chlorinated water is re-introduced into the larger amount of effluent. The chlorinated effluent is then forced through a standard water meter for determining effluent volume and then into a detention chamber which is comprised of a length of relatively large diameter pipes. The chlorine is dissipated within the detention chamber. The effluent is then forced into a smaller diameter pipe leading to a discharge tube. A regenerative blower is incorporated into this pipe for the purpose of replenishing the oxygen level of the effluent by injecting air into the line. The purified effluent is then discharged into a natural waterway.

This system allows for the removal of all solids, the use of a gas chlorine injector, the accurate and inexpensive measurement of discharge, the dissipation of chlorine and the regeneration of an adequate oxygen level. The system is simple, innovative, effective, and inexpensive to operate.

BRIEF DESCRIPTION OF THE DRAWINGS

Figure one is a top elevation view of the system's components arranged in a workable fashion.

Figure two is a side elevation view of the sand and gravel filter and its related connections to the system.

DETAILED DESCRIPTION OF THE INVENTION

Figure 1:
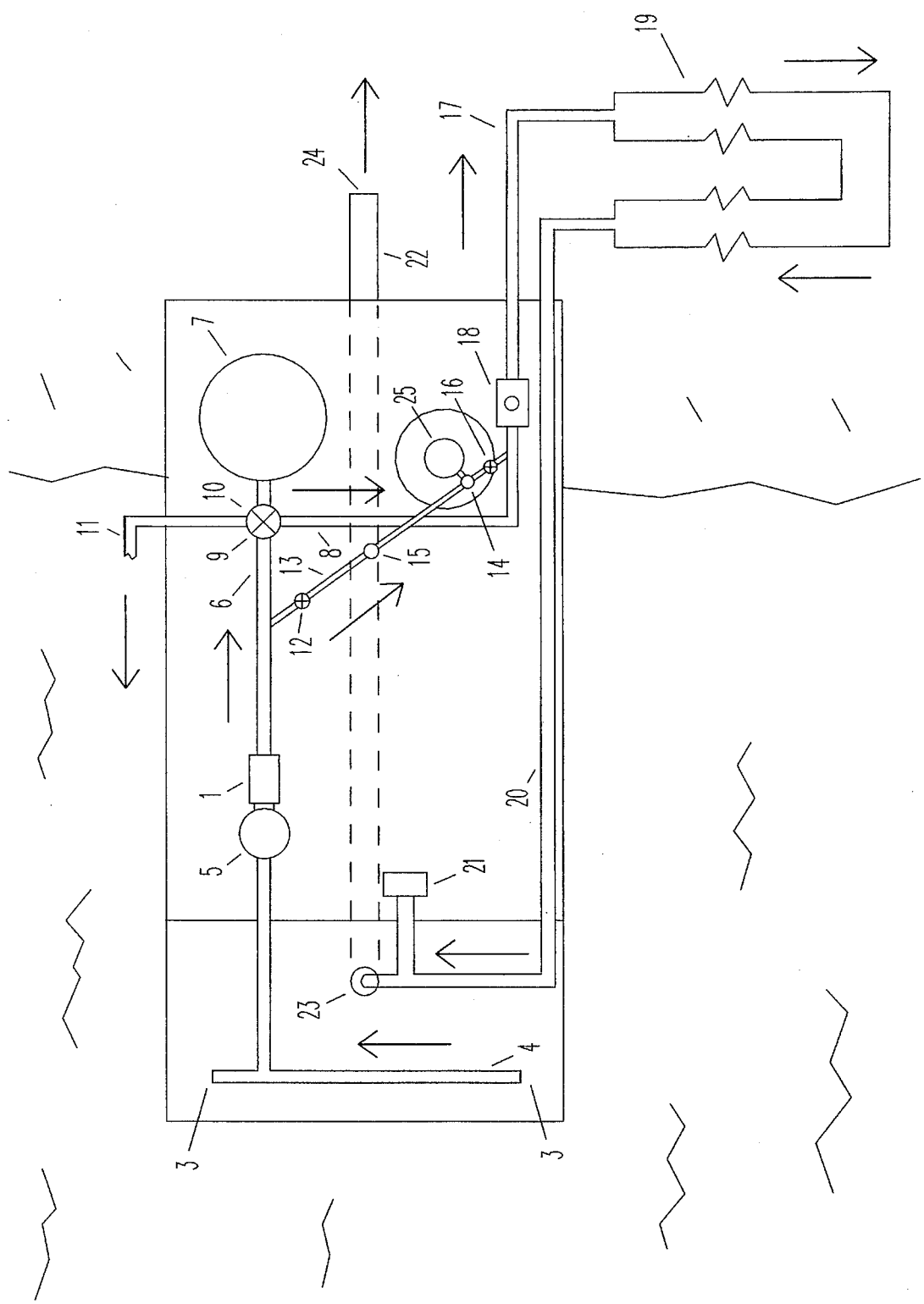
Figure 2:
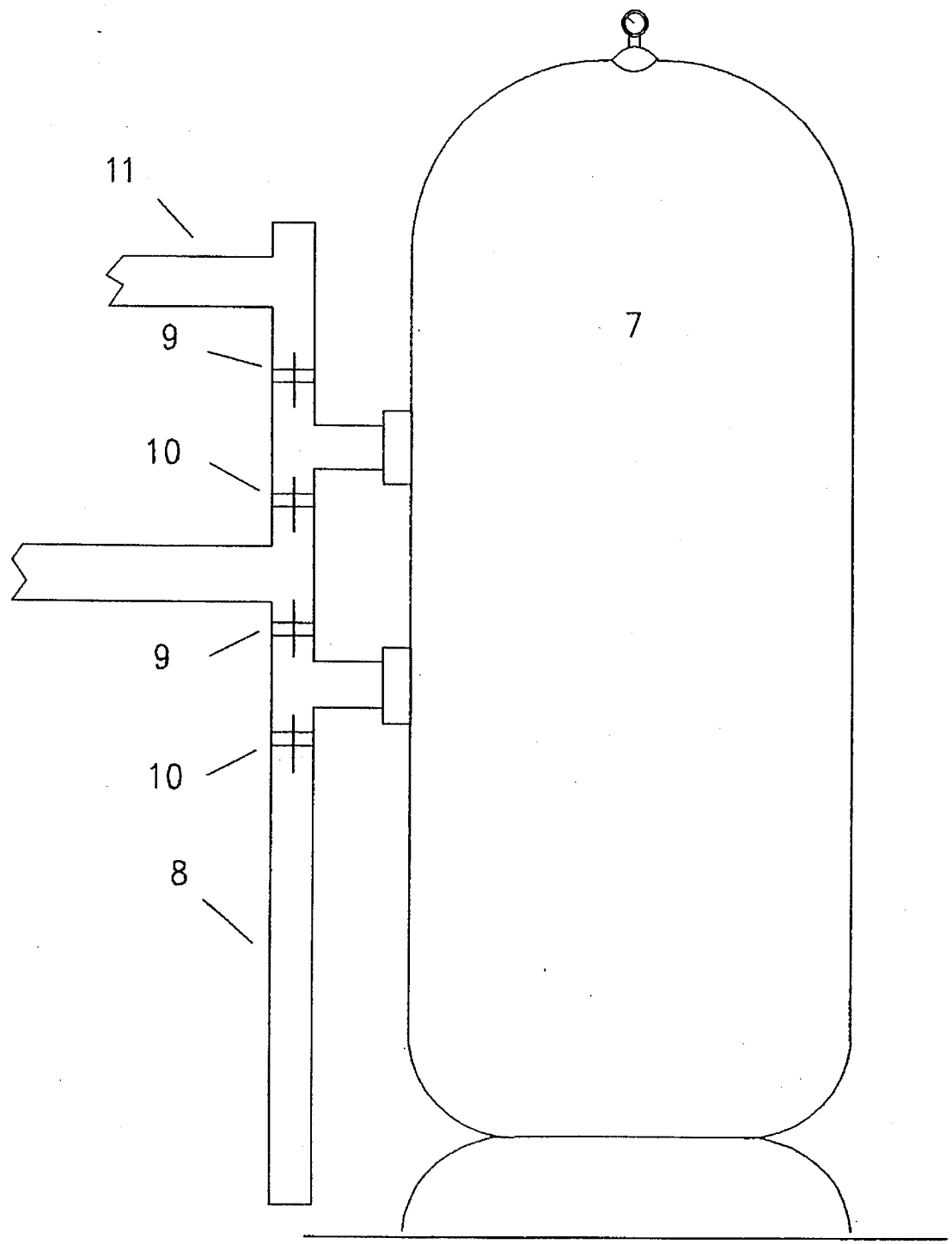

Referring to the drawings it can be seen that a centrifugal pump 1 draws effluent from a holding pond 2 by way of inlets 3 of water effluent intake pipe 4. A trash filter 5 is placed in line with effluent intake pipe 4 so as to catch larger suspended particles prior to the effluent's entry into pump 1. effluent is pumped down pipe 6, into sand and gravel filter 7. Effluent is forced through sand and gravel filter 7, where practically all suspended solids are removed, and into flow pipe 8. Backwash valves 9 and flow valves 10 are arranged so that they may be manipulated so as to backwash sand and gravel filter 7 through backwash pipe 11. The back wash is reintroduced into holding pond 2. The filtered effluent leaves the sand and gravel filter 7 through flow pipe 8. A chlorine injector pipe 13 is taped into pipe 6 so as to deliver effluent to chlorine gas injector 14. A screen filter 15 is located in line with chlorine injector pipe 13 prior to chlorine gas injector 14. This filter assures that suspended particles are kept from the chlorine gas injector. Valves 12 and 16 are located in line with chlorine gas injector pipe 13. This allows for the isolation of the chlorine gas injector 14 during the backwash cycle. Chlorine is injected into the effluent flowing through the chlorine injector pipe 13 by the chlorine gas injector 14. The heavily chlorinated effluent is injected into the exit pipe 17, thus mixing chlorine throughout the effluent leaving the holding pond. The chlorine injector pipe 13 is taped into the pipe 6 prior to the sand and gravel filter 7 and reintroduced into the exit pipe 17 after the greater volume of the effluent has been filtered. This results in a sudden drop in head pressure which assures that the chlorine gas injector 14 has the necessary pressure upon which to operate and can properly chlorinate the entire flow of effluent without the entire flow being required to traverse the chlorine gas injector. The combined effluent then travels to a water meter 18. As the effluent traverses the water meter 18, its volume is accurately measured. The effluent then enters a detention chamber 19. The detention chamber 19 is made up of a length of larger diameter pipe. This pipe is of sufficient volume so that the effluent is held within the detention chamber long enough for the chlorine to dissipate. The effluent then enters discharge pipe 20. A regenerative blower 21 is fixed to discharge pipe 20 so as to introduce oxygen into the purified effluent. A drain pipe 22 is situated so as to accept the purified effluent from the discharge pipe 20. The inlet 23 of the drain pipe 22 is located over holding pond 2 so that excess effluent reinters the system. The outlet 24 of the drain pipe is situated so as to deliver the purified effluent to a natural waterway.

Referring to figure two it can be seen that solenoid flow valves 10 and solenoid backwash valves 9 may be manipulated to occasionally back wash sand and gravel filter 7. Chlorine is supplied in gaseous form by chlorine bottle 25.

It is respectfully submitted that the system as described above will provide an economical, highly efficient, and practical method for final purification of liquid waste in a manner than can easily be controlled, measured, and monitored.

I claim:

1. An apparatus for use in the final stage of the purification of sewage water after treatment in standard sewage holding ponds for removal of large and small suspended matter, elimination of decomposition bacteria, and replenishment of oxygen, comprising an intake pipe, said intake pipe taking said sewage water from said pond, a trash filter, said filter being in line with said intake pipe so as to remove large particles, an effluent pump, said pump being in line with said intake pipe so as to draw said sewage water into said apparatus and put said sewage water under pressure, a transfer pipe, said transfer pipe so affixed as to carry said sewage water away from said pump, a sand and gravel filter, said sand and gravel filter being connected to said transfer pipe and in line with the flow of said sewage water so as to have said sewage water traverse said sand and gravel filter so as to remove said small suspended particles from said sewage water, said sand and gravel filter being periodically back flushed into said pond, a water meter, a flow pipe connecting said sand and gravel filter to said water meter, a chlorine gas injector, a chlorine injector pipe, said chlorine injector pipe being connected to said transfer pipe so as to take a portion of said sewage water directly to said chlorine injector for chlorinating, an injector exit pipe, said injector exit pipe connecting said chlorine gas injector to said flow pipe so as to mix said sewage water traversing said chlorine gas injector with said sewage water traversing said sand and gravel filter within said flow pipe, a screen filter, said screen filter being placed in line with said chlorine injector pipe so as to remove said small particles from said sewage water prior to entry into said chlorine gas injector, a detention chamber, said detention chamber being connected to said flow pipe so that said chlorine may be dissipated within said detention chamber, a discharge pipe, said discharge pipe so affixed as to take said sewage water from said detention chamber out of said apparatus, and a regenerative fan, said fan affixed so as to introduce air into said sewage water inside said discharge pipe.

2. An apparatus as recited in claim 1, wherein said detention chamber further comprises a length of pipe.

3. An apparatus as recited in claim 2, wherein said detention chamber is submerged.

* * * * *